(12) United States Patent
Koningstein

(10) Patent No.: US 8,473,347 B1
(45) Date of Patent: *Jun. 25, 2013

(54) OPTIMAL PRICING AND ADVERTISEMENT SLOT ALLOCATION

(75) Inventor: Ross Koningstein, Atherton, CA (US)

(73) Assignee: Google Inc., Mountain View, CA (US)

(*) Notice: Subject to any disclaimer, the term of this patent is extended or adjusted under 35 U.S.C. 154(b) by 535 days.

This patent is subject to a terminal disclaimer.

(21) Appl. No.: 12/621,878

(22) Filed: Nov. 19, 2009

Related U.S. Application Data

(63) Continuation of application No. 12/577,412, filed on Oct. 12, 2009.

(51) Int. Cl.
*G06Q 30/00* (2012.01)
*G06F 17/22* (2006.01)

(52) U.S. Cl.
USPC ............... 705/14.43; 705/14.4; 705/31

(58) Field of Classification Search
USPC .................... 705/14.4, 14.43, 7.31
See application file for complete search history.

(56) References Cited

U.S. PATENT DOCUMENTS

| 7,783,529 | B2* | 8/2010 | Sandholm et al. | 705/28 |
| 2004/0019552 | A1 | 1/2004 | Tobin | |
| 2007/0288350 | A1 | 12/2007 | Bykowsky | |
| 2008/0255921 | A1 | 10/2008 | Flake et al. | |
| 2010/0017298 | A1* | 1/2010 | Stukenborg et al. | 705/14.71 |
| 2010/0262499 | A1* | 10/2010 | Karlsson et al. | 705/14.72 |

OTHER PUBLICATIONS

The Economic Motive Behind Google's New Advertisement Algorithm, Jameszol Aug. 12, 2007.*
"Want That Top Ad Position on Google? The Rules Are about to Change" Aug. 8, 2007, Barry Schwartz.*
"Upcoming change to the top ad placement formula", Aug. 8, 2007.*

* cited by examiner

*Primary Examiner* — Yehdega Retta
(74) *Attorney, Agent, or Firm* — Leason Ellis LLP

(57) ABSTRACT

An allocation subsystem allocates advertisement slots based on cumulative demand of the advertisement slots. The cumulative demand can be based on a softened demand curve for advertisers that have submitted bids for allocation of the advertisement slot. The demand curves can be adjusted to regulate a variance of the advertisers spend rate throughout a budget period.

20 Claims, 10 Drawing Sheets

OPTIMAL PRICING AND ADVERTISEMENT SLOT ALLOCATION

CROSS-REFERENCE TO RELATED APPLICATIONS

This application is a continuation application of, and claims priority to, U.S. patent application Ser. No. 12/577, 412, entitled OPTIMAL PRICING AND ADVERTISEMENT SLOT ALLOCATION, to inventor Ross Koningstein, which was filed on Oct. 12, 2009. The disclosure of the foregoing application is incorporated herein by reference in its entirety.

BACKGROUND

This document relates to content presentation.

The Internet enables access to a wide variety of content items, e.g., video and/or audio files, web pages for particular subjects, news articles, etc. Such access to these content items has enabled opportunities for advertising. For example, web pages can include one or more advertisement slots in which advertisements can be displayed.

Advertisement slots can be sold at a predefined price or sold in a spot market auction. For example, an advertisement slot can be sold in a spot market auction based on effective values of bids (e.g., actual CPM bids or estimated forward looking CPM bids) that are received in for the advertisement slot. In turn, the winning bidder (e.g., advertiser) is the bidder that submitted the maximum bid for the advertisement slot. This bidder will pay an amount less than or equal to its maximum bid price depending on the bids submitted by other bidders and the type of auction performed.

Bidders may also set budgets for online advertising. The budgets can limit the amount that each bidder spends over a predefined period (e.g., day, week, or month) for advertisement slots. For example, when an advertiser's budget has been exhausted, the budget can prevent the bidder's bid from being considered in further auctions until the predefined period ends. Thus, the bidder will not have an opportunity to advertise again until the beginning of a new predefined period or the bidder changes or overrides the budget.

When advertisement slots are allocated according to auctions and/or using advertising budgets inequities and inefficient allocation of advertising slot inventory can occur. For example, advertisements may appear together on a same page even though the advertisers are paying substantially different prices for presentation of the advertisements. Similarly, the absence of a budget-limited bidder in subsequent auctions can alter the demand for advertising slot inventory such that other bidders can obtain the advertisement slots at prices much lower than were previously paid when the budget-limited bidder was competing in the auction.

SUMMARY

In general, one aspect of the subject matter described in this specification can be implemented in methods that include the actions accessing maximum bids for advertisers, the maximum bids being maximum prices that the advertisers agree to pay for allocation of advertisement slots, where the maximum prices can be based on actual performance or estimated forward looking performance and can be normalized; identifying, by a processing system, a cumulative supply over a specified period; for each advertiser, generating, by a processing system, a softened demand curve based on the maximum bid corresponding to the advertiser, the softened demand curve specifying a plurality of pairs of price and demand for the advertiser; identifying, by a processing system, a common price at which the cumulative supply satisfies cumulative demand for advertisement slots, the common price being a price at which a page revenue satisfies a page revenue threshold; and allocating, by a processing system, the advertisement slots to each advertiser based on a portion of the cumulative supply demanded by each advertiser at the common price. Other implementations of this aspect include corresponding systems, apparatus, and computer program products.

Another aspect of the subject matter described in this specification can be implemented in methods that include the actions identifying, by a processing device, a derating variance over a specified period, the derating variance being a measure of variance for an effective bid over the specified period; determining, by a processing device, whether the derating variance exceeds a threshold variance; increasing, by a processing device, a slope of a demand curve in response to the derating variance exceeding the threshold variance to generate an adjusted demand curve; and allocating, by a processing device, advertisement slots based on the adjusted demand curve. Other implementations of this aspect include corresponding systems, apparatus, and computer program products.

Particular embodiments of the subject matter described in this specification can be implemented so as to realize one or more of the following advantages. Allocation of advertisement slots can be allocated in a manner that is more equitable to advertisers by allocating the advertisement slots at a common price based on a cumulative demand for the advertisement slot. Revenue realized by publishers can be increased by allocating each advertisement slot at a price corresponding to the cumulative demand for the advertisement slot. An optimal number of advertisement slots can be specified for presentation with a document based on a cumulative demand for advertisement slots over a price range.

The details of one or more embodiments are set forth in the accompanying drawings and the description below. Other features, objects, and advantages of the invention will be apparent from the description and drawings, and from the claims.

DESCRIPTION OF DRAWINGS

FIG. 4B is a flow chart of an example process for

FIG. 4C is a flow chart of an example process for

Like reference symbols in the various drawings indicate like elements.

DETAILED DESCRIPTION

Figure 1:
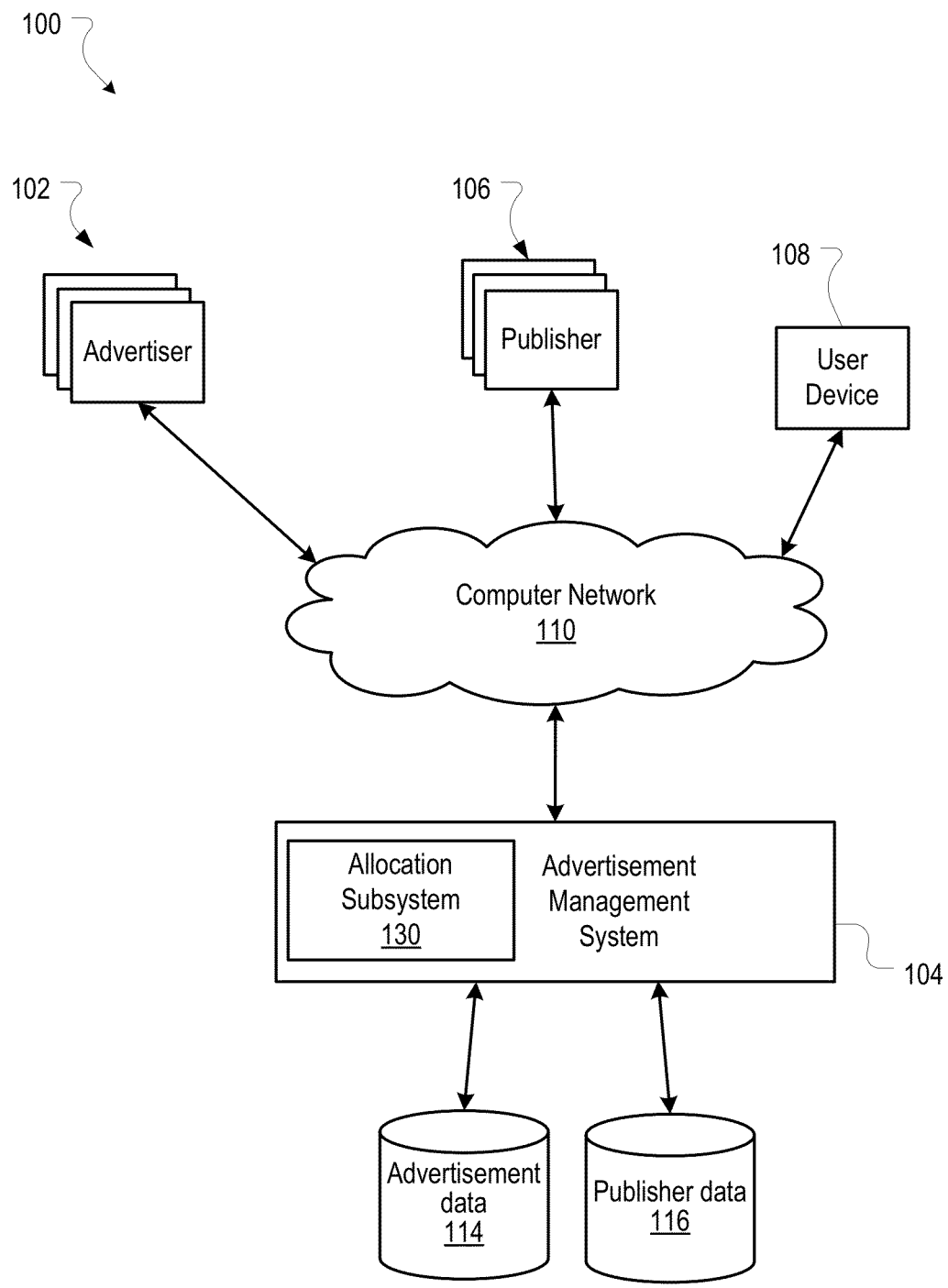
FIG. 1 is a block diagram of an example online environment in which an allocation subsystem can be implemented.

FIG. 1 is a block diagram of an example online environment 100 in which an allocation subsystem 130 can be implemented. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102, an advertisement management system 104, publishers 106 and user devices 108. The online environment 100 may include many thousands of advertisers 102, publishers 106 and user devices 108. Throughout this document advertisement slot pricing and allocation are described with relation to online advertising. However, the pricing and allocation systems and methods disclosed can be implemented for other items. For example, the allocation subsystem 130 disclosed can be used to price and allocate print media advertisement placements, goods being auctioned over a time period, commodities, etc.

In some implementations, advertisers 102 can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document. The advertisements may also include embedded information, such as links, meta-information, and/or machine executable instructions, such as HTML or JavaScript™.

A user device 108 (e.g., personal computer, mobile communications device, or television set top box) can request content from a publisher 106. In response, publisher 106 can provide a web page that includes the content requested. The publisher 106 may define portions of the provided web page in which advertisements can be presented. These defined portions of the web page are referred to as advertisement slots. Publisher data specifying characteristics of advertisement slots that are defined for web pages can be stored in a data store such as the publisher data store 116. The characteristics of the advertisement slots can include a reference (e.g., URL) to the web page for which the advertisement slot is defined, a size of the advertisement slot, and/or media types that are available for presentation in the advertisement slot.

Advertisements that are presented in the advertisement slots can be provided by an advertisement management system 104. For example, the advertisement management system 104 can receive a request from the publisher for an advertisement to place in an advertisement slot on the publisher's web page. The system 104 responds by sending an advertisement for placement in the advertisement slot. The publisher 106 can transmit information about the advertisement back to the advertisement management system 104, including information describing how, when, and/or where the advertisements were rendered (e.g., in HTML or JavaScript™).

The advertisers 102 and/or user devices 108 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as an impression rate, a click-through-rate ("CTR"), conversion rate, etc.

An impression occurs each time that an advertisement is presented to a user. For example, in the online environment 100, an impression can occur each time the advertisement is presented on a user device 108. Impressions can be tracked, for example, by advertisers 102 based on the number of times that the advertisement is successfully presented. Additionally, impressions can be tracked by publishers 108 based on the number of times that the advertisement is requested for presentation.

A click-through can occurs when a user of a user device 108, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

Advertisement data specifying how, when, and/or where the advertisements were rendered (e.g., in HTML or JavaScript™) as well as usage information regarding the performance of the advertisements can be stored in a data store such as the advertisement data store 114. Advertisement data in the advertisement data store 114 can be indexed based the advertisement to which the data corresponds and/or the advertisement slot in which the advertisements were presented. The advertisement data can be accessed and processed, for example, to generate performance measures for advertisements and/or advertisement slots over specified periods of time.

The advertisement management system 104 includes an allocation subsystem 130. The allocation subsystem 130 can include one or more processors that are configured to allocate advertisement slots for a web page to advertisers 102. In turn, advertisements for the advertisers 102 can be provided for presentation with the web page.

The allocation subsystem 130 can allocate advertisement slots to advertisers 102 based on maximum bids that are provided by the advertisers. For example, each advertiser 102 can specify a maximum price that the advertiser 102 will pay for presentation of an advertisement with a web page or in a particular advertisement slot defined for the web page. The maximum bids can be specified, for example, as a maximum cost per click (CPC), a maximum cost per thousand impressions (CPM), or any other performance based payment. Throughout this document, bids and prices are expressed in terms of effective cost per thousand impressions (eCPM)

because eCPM values can be universally used to represent other specified values. For example, eCPM values can be computed as a product of cost per click values and click through rates (i.e., eCPM=CPC*CTR) or a product of cost per action values and conversion rate measures (i.e., eCPM=CPA*Conversion_Rate). Based on the bids, the allocation subsystem 130 can allocate the advertisement slots to advertisers 102 based on the maximum bids that are provided by the advertisers 102.

The allocation subsystem 130 allocates the advertisement slots based on results of an auction for the advertisement slots. A generalized second price (GSP) auction is one example of an auction mechanism that can be used to allocate advertisement slots. In a GSP auction, an advertisement slot is allocated to the advertiser for which a highest maximum bid was provided, but the advertiser pays a price equal an incremental value greater than the value of a next highest maximum bid.

Advertisers 102 can also specify budgets for their advertisements. For example, an advertiser can specify that it only spend $1000 for presentation of advertisements over a one week period. The period of time for which a budget is specified is referred to as a budget period. When an advertiser 102 specifies a budget, the allocation subsystem 130 can condition the advertiser's participation in auctions for advertisement slots on the advertiser's budget having not been met or exceeded for the current budget period. Once the advertiser's budget is met or exceeded, the allocation subsystem 130 can preclude the advertiser from competing in auctions for additional advertisement slots for the remainder of the budget period. Alternatively, the allocation subsystem 130 can selectively include the advertiser in auctions throughout the budget period so that the advertiser's advertisement can be presented throughout the budget period.

While the allocation subsystem 130 can enforce budgets for advertisers 102 by conditioning the advertiser's participation on the budget, when an advertiser 102 is prevented from participating in an auction, the advertiser's demand for the advertisement slot is not considered in allocating or pricing the advertisement slot. Therefore, another advertiser may obtain the advertisement slot at a substantially lower price than the advertiser 102 that was prevented from participating in the auction would have paid for the advertisement slot. Thus, allocating advertisement slots according to an auction for which participation is conditioned on a budget can result in inequities among the advertisers that are allocated the advertisement slot at different times throughout a budget period.

Thus, in some implementations, the allocation subsystem 130 can facilitate more equitable allocation and pricing of advertisement slots by allocating and pricing the advertisement slots based on a cumulative demand for advertisement slots as measured by a performance metric. The cumulative demand is the total demand from all advertisers that demand advertisement slots at a particular price. The allocation subsystem 130 can identify the cumulative demand for a supply of advertisement slots, as measured by performance measures (e.g., impressions, clicks, or other performance measures), and price each unit of supply (i.e., each advertisement slot) at a common price for all advertisers. Thus, each advertiser 102 that is allocated the advertisement slot will pay the same price regardless of whether the advertiser has specified a budget.

The allocation subsystem 130 can also be implemented to specify a number of advertisement slots that provide maximum revenue for a web page. For example, the allocation subsystem 130 can determine a cumulative demand of advertisement slot performance (e.g., impressions or clicks) over a price range. In turn, the allocation subsystem 130 can identify a number of advertisement slots (per impression) for which the corresponding price for allocation of the advertisement slots results increased revenue for the advertiser or maximal revenue over time.

Figure 2:
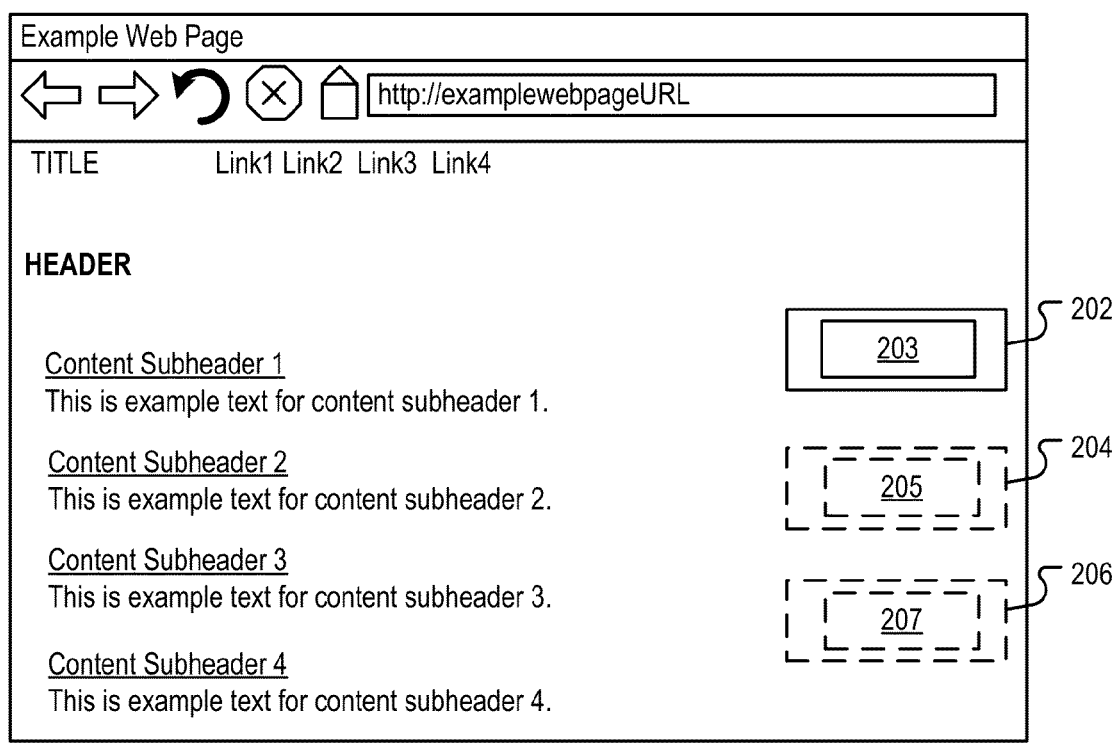
FIG. 2 is an example web page having advertisement slots that are available for allocation.

FIG. 2 is an example web page 200 having advertisement slots that are available for allocation. The example web page 200 includes advertisement slots ("slots") 202, 204 and 206 in which advertisements 203, 205 and 207 can be presented. Slot 202 is depicted with a solid outline indicating that slot 202 will be available for allocation each time that the web page 200 is requested by a user device 108. Slots 204 and 206 are depicted with a dashed outline indicating that slots 204 and 206 can be selectively available for allocation in response to a request by a user device 108 for the web page 200. Three slots 202, 204 and 206 are depicted on web page 200 for example purposes, but a publisher can define any number of advertisement slots on a web page.

Each advertisement slot 202, 204 and/or 206 that is presented with a web page provides supply that is measured by slot performance. The slot performance is a measure of advertising inventory for an advertisement slot. The slot performance can be measured, for example, based on a number of impressions or clicks that the slot provides over a period of time and normalized to some maximal value, such as performance of a single (or top) slot. An estimated slot performance, and corresponding supply, can be determined, for example, from historical measurements of a performance of advertisements to which the slot is allocated.

A cumulative supply of slots for the web page 200 can be determined based on a function of the performance measures for each of the slots 202, 204, and/or 206 that are presented on the web page 200. For example, a sum or weighted sum of average slot performance (i.e., an average performance measure for a slot over time) for each slot 202, 204, and 206 presented with the page can be identified as the cumulative supply of slots for the web page 200.

Throughout this document, the supply of slot performance provided by an individual advertisement slot is referred to as "supply" and the cumulative supply of slot performance provided by advertisement slots presented with a same page is referred to as "cumulative supply."

The supply and cumulative supply that are available when advertisement slot 202 is the only advertisement slot presented with the web page 200 can both be equal to the slot performance provided by slot 202. For example, if slot 202 provides 200,000 impressions each day, the supply provided by slot 202 and the cumulative supply for the web page 200 can be set to 200,000 impressions. Therefore, when only one advertisement slot (e.g., slot 202) is presented with the web page 200, the presented slot provides 100% of the supply for the web page 200. When normalized to the number of impressions, one advertisement slot per impression has a normalized supply of 1.

The supply provided by each slot and the cumulative supply for the web page 200 can each change when additional advertisement slots are presented with the web page 200. When slots 202 and 204 are presented with the web page, the slot performance of slot 202 will be decreased because of the presentation of an advertisement in slot 204. For example, some users that would have previously viewed and/or clicked an advertisement in slot 202, if it were the only advertisement presented, may view and/or click an advertisement in slot 204 instead, or may not view or click advertisements in either of slots 202 or 204 when both slots are presented. Therefore, slot 202 may no longer provide 100% of the supply that it provides when it is the only slot presented. Thus, slot 202's normalized supply value would then be less than 1.

In some implementations, the supply provided by each of the slots 202, 204 and/or 206 that are presented with the web page 200 can be measured relative (e.g. normalized) to the performance of slot 202 when presented in a single slot configuration (i.e., slot 202 presented alone). For example, historical performance data may indicate that in a two slot configuration (i.e., slot 202 and 204 presented), slot 202 provides 95% of the impressions (or clicks) that it provides in the single slot configuration. Similarly, the historical performance data may provide that in a two slot configuration, slot 204 provides 85% of the impressions (or clicks) that slot 202 provides in a single slot configuration. Thus, the cumulative supply for web page 200 in the two slot configuration is 180% (i.e., 95%+85%) of the supply provided by slot 202 in a single slot configuration. Table (1) provides example supplies relative to (e.g., normalized to) the supply provided by slot 202 in the single slot configuration for one, two and three slot configurations.

TABLE (1)

|  | Single Slot Configuration | Two Slot Configuration | Three Slot Configuration |
| --- | --- | --- | --- |
| Ad Slot 202 | 100% | 95% | 82% |
| Ad Slot 204 | 0% | 85% | 71% |
| Ad Slot 206 | 0% | 0% | 54% |

The cumulative supply provided by advertisement slots can be allocated to advertisers in a number of different ways. For example, slots 202, 204 and/or 206 can be iteratively allocated for each presentation of the page 200 based on auction results. In a generalized second price auction the slots 202, 204 and/or 206 are allocated based on maximum bids received from advertisers 102 by the advertisement management system 130. For example, the highest bidder is awarded the first allocated slot (e.g., slot 202) and pays the maximum bid of the second highest bidder. Similarly, the second highest bidder is allocated the second slot (e.g., slot 204) and pays the maximum bid of the third highest bidder. The auction allocation process continues until each available slot is allocated to a bidder. This type of auction ensures that each slot is allocated to the highest bidder that is participating in the auction.

While allocating slots 202, 204 and/or 206 based on an auction can achieve an allocation that places higher bidders in slots over lower bidders, there are situations in which an allocations based on an auction may lead to inequities and inefficiencies. For example, advertisers having advertisements that appear in slot 206 may be paying substantially less (e.g., one or more orders of magnitude less) than the advertisers having advertisements that appear in slot 202. However, both of the advertisements appear on the same page 200, and are likely positioned near each other (e.g., down a right hand side of a screen). Additionally, presentation of the advertisement in slot 206 decreases the relative performance of slot 202. Therefore, the advertisement presented in slot 202 will likely provide less return than if it were the only advertisement presented. Thus, it is possible that the advertisement presented in slot 206 may have a higher return on advertising investment than the advertisement presented in slot 202 because slot 206 was allocated at a much lower price than slot 206.

Another inequity can occur when advertisers that condition presentation of advertisements based on budget constraints pay more for a particular slot than an advertiser that does not invoke budget constraints, as described below.

Budget constraints ("budgets") specify maximum amounts that advertisers 102 will pay for advertisement slots over a budget period. Once an advertiser's budget has been met, the advertiser may be budget-limited such that the advertiser's bid for an advertisement slot may not be considered during subsequent auctions that are performed during the budget period. Therefore, demand for the advertisement slots decreases that, in turn, potentially results in lower prices for the same slots for which the budget-limited advertiser was paying higher prices.

For example, web page 200 may have one slot 202 available for allocation. The advertisement management system 130 may receive maximum eCPM bids from three advertisers 102 of $5, $3 and $1 for slot 202. If slot 202 is allocated according to a generalized second price auction, slot 202 will be allocated to the advertiser that bid $5 for a price of $3. As long as advertiser that bid $5 maintains the highest bid and continues to compete in the auctions, that advertiser will be allocated slot 202.

However, if the advertiser that bids $5 also has a budget constraint, then this advertiser will not compete in auctions once its budget has been exhausted. For example, the advertiser that bids $5 may also provide a budget of $300 per day. Therefore, once the advertiser has spent $300 for presentation of its advertisement, the advertiser becomes a budget-limited advertiser and will no longer participate in auctions of slot 202. When the budget-limited advertiser is not competing in auctions for slot 202, the advertiser that bid $3 will be allocated slot 202 at a price of $1 (e.g., the next highest bid for slot 202). Thus, the advertiser that bid $3 is allocated the same slot (i.e., slot 202) that advertiser 102a was receiving, but paying ⅓ of the price.

This budget-limited scenario illustrates an inequity that can result when slots are allocated and priced based solely on a generalized second price auction. In particular, some advertisers may pay significantly more than other advertisers for the same slot, based on a potentially artificial change in demand.

In some implementations, the allocation subsystem 130 can also adjust bids (i.e., perform bid de-rating) for advertisers that have provided budgets in an effort to cause the advertiser's budget to be exhausted closer to the end of the budget period than the budget might otherwise be exhausted. This bid-derating can be performed in conjunction or independent of the budget-limiting described above.

For example, an advertiser 102 can authorize the allocation subsystem 130 to periodically adjust the advertiser's bid based on an amount remaining in the advertiser's budget, a spend rate, and an amount of time remaining in the budget period. In turn, the advertiser's bid can be decreased when its spend rate indicates that the advertiser's budget will be exhausted prior to the end of the budget period and increased (limited by the maximum bid) when the spend rate indicates that the advertiser will not spend its budget by the end of the budget period.

While an advertiser's bid can be adjusted in an effort to achieve a spend rate for the advertiser that causes its budget to be exhausted at the end of a budget period, the adjustments can cause very large changes in a number of advertisement slots that are allocated to the advertiser. For example, the value of the adjusted bid for an advertiser may fall just below other advertiser's bids such that the advertiser does not receive any (or very few) allocations of an advertisement slots based on the adjusted bid.

In some situations, it is possible that the advertiser will not receive any allocations of an advertisement slot until the advertiser's spend rate is recomputed and determined to be at or below a target spend rate. Additionally, the missed allocations may be obtained by other advertisers at prices well below what the advertiser previously paid for the advertisement slot. Thus, solely adjusting bids on a target spend rate may effectively result in inequities similar to those experienced by budget-limited advertisers because when the advertiser's bid is reduced, its demand for the slot may not be considered. Additionally, due to large variations in numbers of allocations that an advertiser receives between bid adjustments, it can also be difficult to achieve budget exhaustion at substantially the end of the budget period.

In addition to inequities that may exist when slots are allocated according to a second price auction, some advertisers may have an incentive to provide lower bids to obtain cheaper slots after higher bidders have exhausted budgets (or to obtain other slots). For example, an advertiser may identify that it is sometimes allocated advertisement slots at substantially lower prices. Based on this information, the advertiser may reduce its bid so that it only accepts these lower priced allocations. Therefore, the advertiser may realize a much higher return on advertising investment than other advertisers that specify a higher maximum bid, but also specify a budget because the advertiser that specified a budget may not participate in auctions once the budget has been exhausted.

Further, when supply is allocated based solely on an auction, publishers may receive lower revenues due to reductions in the price of a slot when budget-limited advertisers no longer compete for the slots. For example, although the publisher receives a higher price on a portion of the web page presentations (i.e., when all advertisers are competing), the revenue may drop significantly when budget limited advertisers do not participate in the auctions. This reduction in revenue may not be offset by the higher prices that are realized for the advertisement slot when all advertisers are competing, thereby reducing the revenue that the publisher may realize if the advertisement slot were allocated to each advertiser for a common price.

In some implementations, the allocation subsystem 130 can reduce inequities and other inefficiencies that may exist in an auction environment by allocating supply based on a cumulative (i.e., total) demand for the supply. For example, the allocation subsystem 130 can identify the cumulative supply for a web page as described above and the cumulative demand by advertisers for the cumulative supply irrespective of whether the advertiser is currently budget-limited. In turn, the allocation subsystem 130 can allocate the cumulative supply at a price that reflects the cumulative demand for the cumulative supply.

The allocation subsystem 130 can determine the cumulative demand for cumulative supply of a web page based on the bids and budgets that are received from advertisers 102. The allocation subsystem 130 can define a perfectly inelastic demand curve for each advertiser 102 based solely on the maximum bids received from the advertisers 102.

Continuing with the example bids provided above, the allocation subsystem 130 can define an inelastic demand curve at $5.00 effective cost per-thousand-impressions based on the maximum eCPM bid of $5.00. Thus, at any eCPM price higher than $5.00, advertiser 102a will have an impression demand of zero and therefore will not be allocated slots 202, 204 and/or 206. Conversely, at eCPM prices less than $5.00, advertiser 102a will have an infinite impression demand, such that advertiser 102a will accept all allocations of advertisement slots.

The allocation subsystem 130 can similarly define the inelastic demand of advertisers 102b and 102c as $2.50 and $1.00 eCPM, respectively. Accordingly, at prices that exceed their respective inelastic demands, advertisers 102b and 102c will each have an impression demand of zero and at prices less than or equal to their respective inelastic demands, advertisers 102b and 102c will have an infinite impression demand, such that they will accept all allocations of advertisement slots.

While the maximum bid provides a price at which an inelastic demand curve can be defined for each of the advertisers 102a, 102b and 102c, the inelastic demand curves may not accurately reflect each advertiser's demand. For example, an advertiser's demand may be more elastic than represented by the inelastic demand curve due to a desire to spend its budget evenly over a budget period or a desire to achieve a threshold return on investment.

In some situations, an advertiser's demand curve can be softened (i.e., made more elastic) to better represent an advertiser's demand for supply. For example, a highest bidding advertiser may not actually have infinite demand for advertisement slots at its maximum bid. Therefore, a softened demand curve can be created to estimate the advertiser's demand, as described below.

In addition to more accurately representing the advertiser's demand, softening an advertiser's demand curve can also regulate the variance of an advertiser's spend rate when the advertiser's bid is periodically adjusted, for example, based on bid derating. An advertiser's spend rate is the rate at which the advertiser spends its budget over the budget period. Regulating an advertiser's spend rate variance helps ensure that the advertiser is allocated supply more uniformly throughout a budget period and exhausts its budget at substantially the end of a budget period.

In some implementations, the softened demand curve provides an estimated demand for the advertiser over a price range. An advertiser's demand curve can be estimated, for example, by generating a demand curve that has one end point corresponding to substantially zero demand when the price of an advertisement slot is equal to the advertiser's maximum bid and another end point corresponding to a demand for each available presentation of the advertisement slot. The second end point can be defined, for example, based on a specified slope of a linear demand curve, as described below. The specified slope can be selected, for example, based on statistical analysis of prices paid by advertisers for various advertisement slots or set to a default value (e.g., 0.1).

An inelastic demand curve can also be softened, for example, based on a budget corresponding to the maximum bid. The estimated demand for each advertiser that has provided a budget can represent a portion of estimated available supply that, when provided to satisfy demand at a corresponding price, will exhaust the advertiser's budget at substantially the end of the budget period.

Figure 3A:
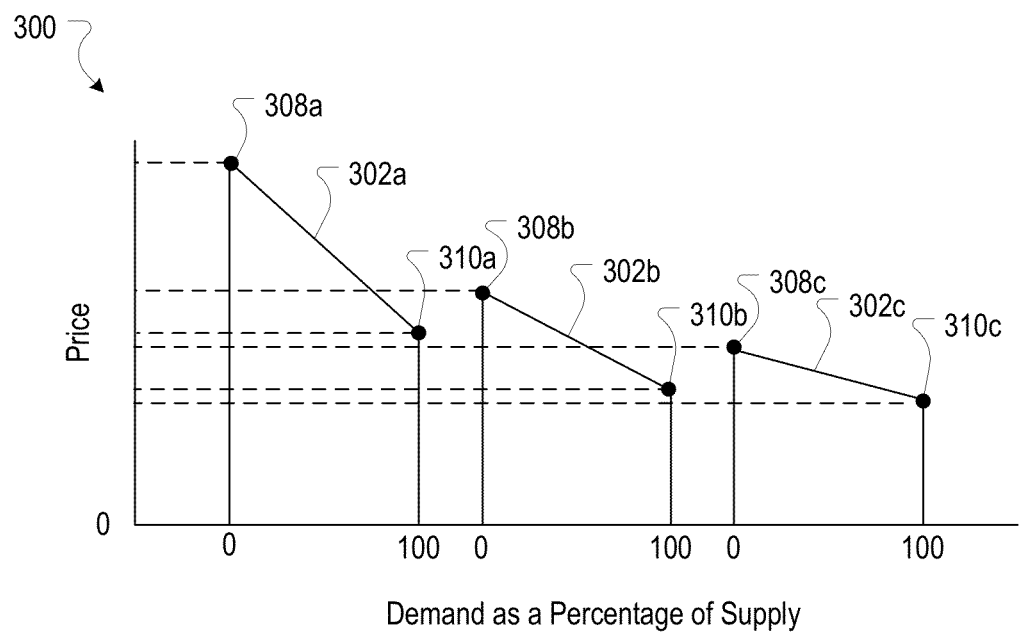
FIG. 3A is a graph illustrating softened demand curves for advertisers.

FIG. 3A is a graph illustrating softened demand curves 302a, 302b and 302c for advertisers 102a, 102b and 102c, respectively. Each softened demand curve 302a, 302b and 302c is plotted on a common price scale, and respectively independent demand scales of 0-100%. Each softened demand curve can include a first end point 308 and a second end point 310. Each first end point 308 can define a first price above which the advertiser does not demand any supply (e.g., estimated impressions). Each second end point 310 can define a second price at which the advertiser will demand all of the available supply (i.e., 100% of estimated impressions).

In some implementations, the allocation subsystem 130 sets the first end point 308 of a softened demand curve as the advertiser's maximum bid. For example, advertiser 102a specified a maximum bid of $5 eCPM. Thus, above an eCPM price of $5, advertiser 102a will have zero demand. Therefore, the allocation subsystem 106 can place the first end point

308 of the demand curve 302a on the graph at a price of $5.00 eCPM and a demand of 0% of the supply.

In some implementations, the allocation subsystem 130 can set the second end point 310 of a softened demand curve based on a specified slope (e.g., 0.1) for the demand curve or at the price at which the advertiser's budget is exhausted at substantially the end of the budget period while accepting allocation of an advertisement slot every time it is presented. For example, if slot 202 is the sole slot being allocated and can supply an estimated 250,000 impressions over the budget period, then advertiser 102a can acquire all of the impressions for a single slot at a price of $0.02 eCPM. Thus, the second end point 310 of the softened demand curve 302a can be located on the graph 300 at a price of $0.02 and a demand of 100% of the supply.

In some implementations, the second end point 310 of a softened demand curve 302 can be defined based on a function of the advertiser's bid and/or budget. For example, the second end point 310 can be set as a fraction of the advertiser's maximum bid. For instance, the allocation subsystem 130 can define the second end point 310 as being located at a price that is 4% below the advertiser's maximum bid price. The fraction of the advertiser's maximum bid can be selected, for example, based on historical price data at which advertisers were allocated supply or a default value.

Once the allocation subsystem 130 has established the first end point 308 and the second end point 310 of a softened demand curve 302, the allocation subsystem 130 can define the remainder of the softened demand curve 302. In some implementations, a linear demand curve can be defined between the first end point 308 and the second end point 310. For example, a line can be defined that connects the first end point 308 and the second end point 310. In turn, the demand as a percentage of supply for the advertiser can be determined at each price point that intersects the line.

Each softened demand curve thus specifies multiple pairs of demand and price representing the advertiser's demand at the corresponding price. While a linear demand curve may be used, other demand functions can be used to define the shape of a softened demand curve 302, for example, based on the characteristics of the market for which demand is being estimated. For example, the demand curve may be a trinomial function in which each factor represents a market condition upon which the demand depends.

Once softened demand curves are generated for each of the advertisers, the allocation subsystem 130 can identify a common price at which the cumulative supply will be allocated and allocate the cumulative supply among the advertisers 102 based on the respective demands of each advertiser 102a, 102b and 102c at the common price. The common price is the price at which the cumulative demand satisfies the cumulative supply. The cumulative demand at each price is the sum of each advertiser's respective demand, based on the softened demand curves, at the respective price.

Figure 3B:
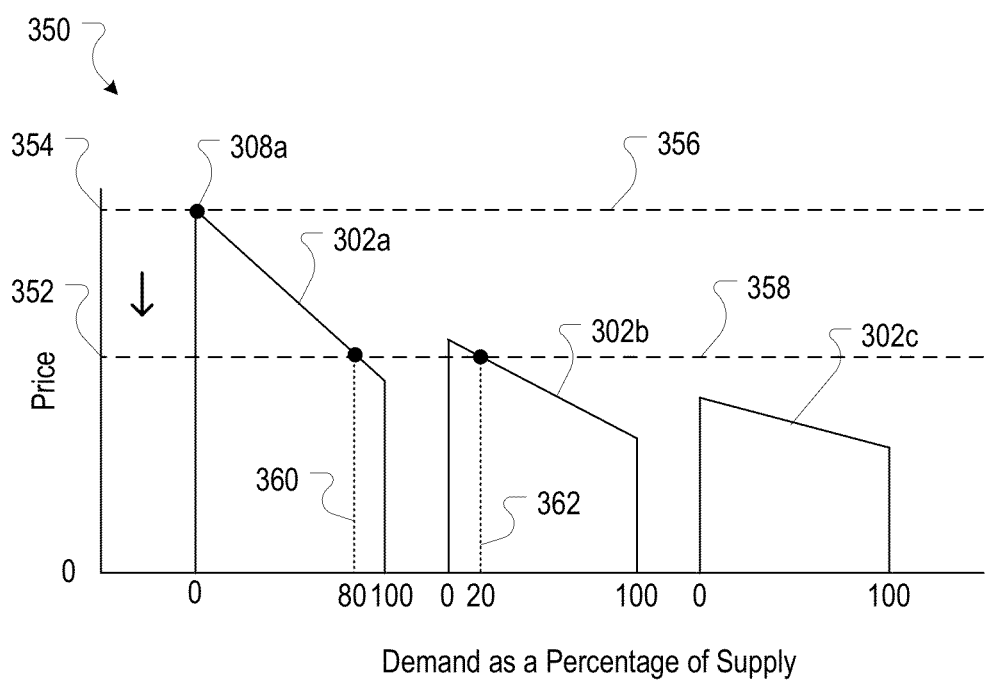
FIG. 3B is a graph that illustrates an example common price for a cumulative supply of slot performance.

FIG. 3B is a graph 350 that illustrates an example common price 352 for a cumulative supply. Identification of the common price for allocation of a single slot is described below with reference to FIG. 3B. While the following description is provided for example purposes, there are other ways in which the common price for a supply of slot performance can be identified.

In some implementations, the allocation subsystem 130 can identify the common price 352 by identifying a first price 354 at which cumulative demand is approximately zero and iteratively identifying the demand at prices lower than the first price 352 until the cumulative demand is substantially equal to the cumulative supply. The allocation subsystem 130 can initialize the first price 352, for example, as the highest maximum bid received from the advertisers 102 for the cumulative supply being allocated. The highest maximum bid can be selected as the first price 352 because no advertiser 102 demands an advertisement slot above the highest maximum bid. Therefore, the common price 352 will not be above the highest maximum bid.

Continuing with the example above, the highest maximum eCPM bid of $5.00 was received from advertiser 102a. Therefore, in this example, the allocation subsystem 130 can set the first price 354 as $5.00. The cumulative demand for the cumulative supply at $5.00 is approximately 0% of the cumulative supply as indicated by the softened demand curves 302a, 302b and 302c because the dashed line 356 only intersects the first end point 308 of the softened demand curve 302a.

Because the cumulative demand at the first price 354 does not satisfy the cumulative supply, the allocation subsystem 130 can decrease the price of the cumulative supply. As the price of the cumulative supply decreases, the cumulative demand for the cumulative supply increases. The allocation subsystem 130 continues decreasing the price of the cumulative supply until the cumulative demand satisfies (i.e., equals) the cumulative supply.

When a single slot is presented on a web page, the cumulative supply is satisfied, for example, when the cumulative demand equals 100% of the cumulative supply. In the present example, the cumulative demand is 100% of the supply at the common price 352 as illustrated by the dashed line 358 that intersects the demand curves 302a and 302b.

At the common price 352, the demand provided by demand curve 302a is 80% of the cumulative supply and the demand provided by demand curve 302b is 20% of the cumulative supply as illustrated by the dotted lines 360 and 362, respectively. Therefore, in this example, an advertiser whose demand is represented by demand curve 302a demands 80% of the cumulative supply (e.g., advertisement slot impressions) at the common price. Similarly, an advertiser whose demand is represented by demand curve 302b demands 20% of the cumulative supply at the common price 352. Accordingly, the allocation subsystem 130 can allocate 80% the advertisement slot presentations (i.e., impressions) to the advertiser whose demand is represented by demand curve 302a, while allocating 20% of the advertisement slot presentations to the advertiser whose demand is represented by demand curve 302b.

In some implementations, the allocation subsystem 130 can determine which advertiser should be allocated an advertisement slot for each individual presentation of the advertisement slot (i.e., impression) based on the results of a semi-random selection that is subject to a probability distribution. The semi-random selection can be implemented, for example, based on the output of a random number generator and a threshold value.

The random number generator can be implemented to generate a random number between 0 and 1. The threshold value for each advertiser can be set, for example, based on the respective demands of the advertisers at the common price. For example, the threshold for the advertisers whose demands are represented by demand curves 302a and 302b can be set to 0.80. Thus, when the random number generator generates a number between 0 and 0.80, the advertisement slot can be allocated to the advertiser whose demand is represented by demand curve 302a. When the random number is between 0.81 and 1.0, the advertisement slot can be allocated to the advertiser whose demand is represented by demand curve 302b.

As discussed above, publishers 106 can allocate multiple advertisement slots for each presentation of a web page. When multiple slots are allocated for at least some of the presentations of the web page, the allocation subsystem 130 can price and allocate the multiple slots in a manner similar to that provided above with respect to single slot allocations.

Figure 3C:
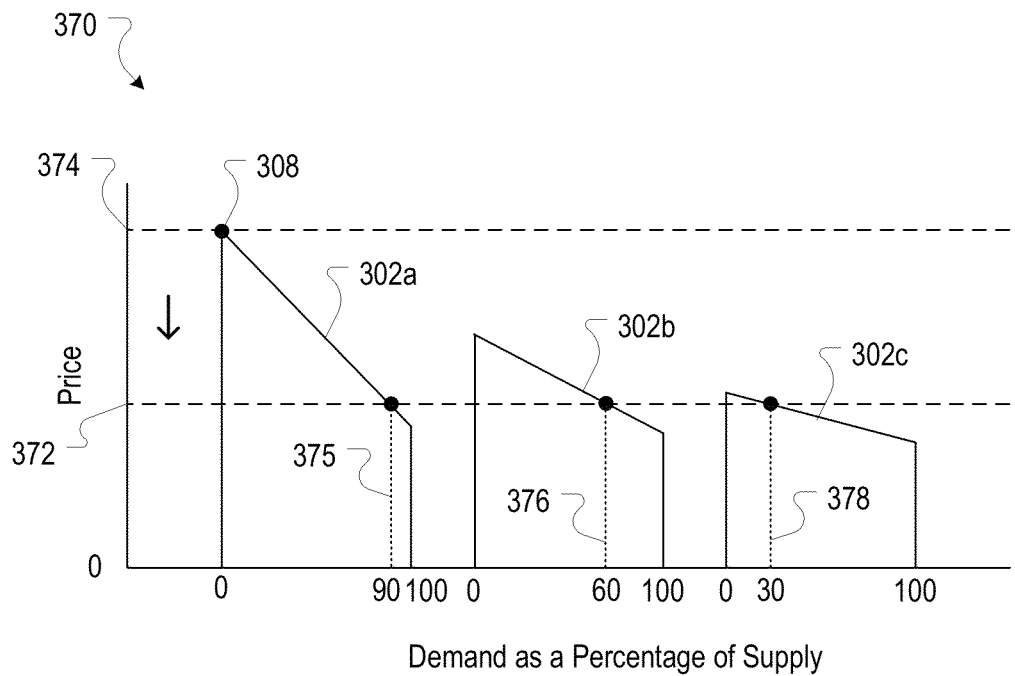
FIG. 3C is a graph that illustrates an example common price for a cumulative supply of slot performance provided by multiple slots.

FIG. 3C is a graph 370 that illustrates an example common price 372 for a cumulative supply provided by multiple slots. Identification of the common price for the cumulative supply provided by multiple slots is described below with reference to FIG. 3C. While the following description is provided for example purposes, there are other ways in which the common price for a cumulative supply can be identified.

As described above, the allocation subsystem 130 can identify the common price 372 for the cumulative supply provided by multiple slots by iteratively lowering a first price 374 until the cumulative supply is satisfied by the cumulative demand. However, when multiple slots are being allocated, the cumulative supply (normalized to the supply provided by a single slot) will generally be greater than 100% of the single slot supply. As described above, the cumulative supply in a two slot situation may be 180% of the single slot supply. In this example, the common price 372 would be the price at which the cumulative demand provided by demand curves 302a, 302b and 302c is 180%.

At the common price 372, the demands provided by demand curves 302a, 302b and 302c are 90%, 60% and 30% as illustrated by the dotted lines 375, 376 and 378, respectively. Thus, the 180% of cumulative supply that is provided by the two advertisement slots is fully demanded at the common price 372 and the allocation subsystem 130 can allocate the cumulative supply to advertisers based on the relative demands provided by the demand curves 302a, 302b and 302c.

The cumulative supply provided by two slots can also be allocated based on the result of a semi-random selection. However, the probabilities with which each advertiser is allocated an advertisement slot are different since there are now two advertisement slots to which each of the advertisers can be allocated and each of the advertisement slots provides only a portion of the supply provided by a single slot presented alone.

As described above, when two slots are presented on a web page, a first slot may provide 95% of the supply that the first slot would provide alone, while a second slot may provide 85% of the supply that the first slot would provide alone.

In some implementations, the probability with which each advertiser is allocated each advertisement slot is based on the relative demand of the advertiser and the relative supply that the advertisement slot provides. For example, the probability that the first slot is allocated to an advertiser whose demand is represented by demand curve 302a can be determined based on a ratio of the demand provided by demand curve 302a and the relative supply provided by the first slot (i.e., allocation probability=demand of advertiser/supply provided by slot). In this example, the probability that the advertisement slot is allocated to an advertiser associated with demand curve 302a can be 0.947 (i.e., 0.90/0.95). Thus, the advertiser associated with the demand curve 302a will be allocated the first advertisement slot for 94.7% presentations of the page. The advertisers associated with demand curves 302b and 302c are allocated units of supply with probabilities that are generated in a similar manner.

In some implementations, the allocation subsystem 130 prevents a single advertiser from being allocated more than one advertisement slot on a particular page. In these implementations, this allocation constraint can be represented as constraints on the advertisers' demands. For example, when the first slot and the second slot are both presented, the maximum demand that any advertiser can have is 95% of the supply that the first slot would provide alone because this is the maximum supply of any individual slot on the page.

Figure 3D:
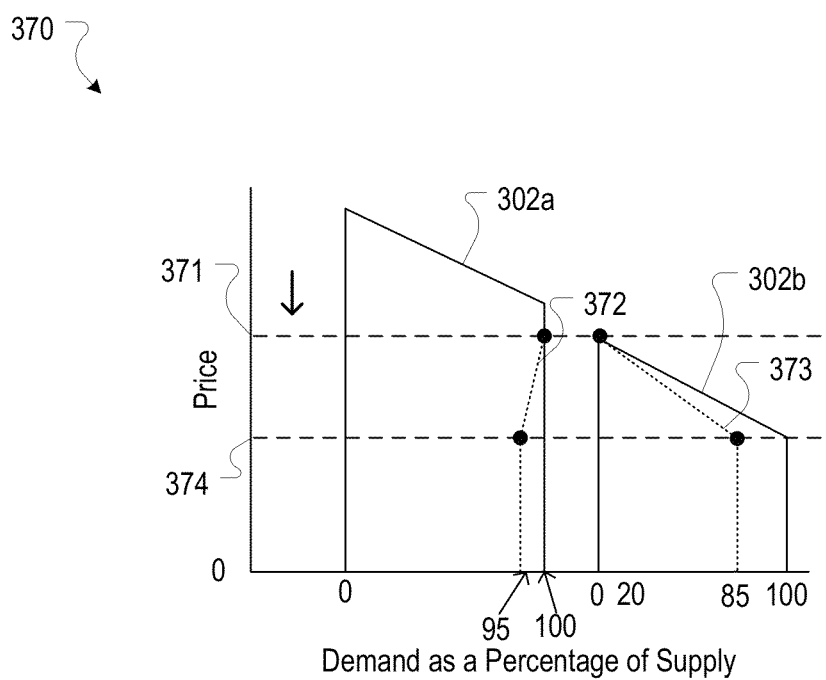
FIG. 3D is a graph that illustrates examples of advertiser demands representing allocation constraints when multiple slots are provided on a page.

FIG. 3D is a graph 370 that illustrates examples of advertiser demands representing allocation constraints when multiple slots are provided on a page. As common price is reduced to a price 371, at which demand curve 302b begins to provide demand for the cumulative supply, a second slot is needed to provide the additional supply provided by demand curve 302b. However, as described above, the supply provided by the first slot on the page will be reduced by including the second slot on the page. Therefore, the maximum demand for any individual advertiser will be constrained because of the constraint that each advertiser can only be allocated one advertisement slot per presentation.

The constraint on the advertiser's demand is represented by the dotted lines 372 and 373. As the price continues to fall to common price 374, the demand for each advertiser can continue to be constrained until the two advertisement slots are fully utilized at the common price 374. At the common price 374, the demand represented by demand curve 302a is 95% of the full supply of the single slot, while demand curve 302b provides a demand of 85% of the full supply of the single slot.

In some implementations, the constraint for the demand curve for a an advertiser having a larger portion of its demand curve above the common price can be constrained less than another advertiser having a small portion of its demand curve above the common price. In other implementations, the demand curves for the advertisers can be constrained an equal percentage or based on a function of the maximum bids and/or budgets provided by the advertisers. Introduction of additional advertisement slots can result in further constraints in a manner similar to that described above.

As allocation of supply occurs throughout a specified period (e.g., a month or a specified budget period), it is possible that the actual supply differs from the cumulative supply that was estimated based, for example, on historical information and represented by the softened demand curves. Changes in the actual supply will affect the spend rate and return on investment that advertisers realize as well as the price at which the supply is allocated. For example, a decrease in the supply will cause the price of the supply to increase assuming that the demand remains the same. This increased price may increase the spend rate of budget-limited advertisers, in turn, requiring bid derating to bring the advertiser's spend rate closer to a target spend rate for the budget period.

Bid derating is a process by which an advertiser's effective bid (i.e., maximum bid*(derating factor <1.0)) is adjusted to regulate the advertiser's actual spend rate relative to a target spend rate. The effective bid is a maximum price that the advertiser will pay for allocation of an advertisement slot. When the advertiser's actual spend rate is less than or equal to the target spend rate, the effective bid can be equal to the advertiser's maximum bid. However, when the advertiser's actual spend rate exceeds the target spend rate, the effective bid can be, for example, a percentage of the maximum bid for the advertiser.

The percentage of the maximum bid by which the maximum bid is derated is referred to as a derating factor. The derating factor can be selected, for example, based on an amount by which the actual spend rate exceeds the target spend rate and a time remaining in the budget period. For example, the derating factor can be selected so that the advertiser's spend rate based on the effective bid will cause the advertiser's remaining budget to be substantially exhausted at the end of the budget period. Bid derating is described in more detail with reference to FIG. 4B.

In some situations, bid derating can result in a large variations of the advertiser's effective bid, thereby creating large changes in the number of impressions that an advertiser receives and, in turn, the spend rate of the advertiser. These large variations make it more difficult for the advertiser's budget to be met with precision. When the variations of the advertiser's effective bid are reduced, the spend rate for the advertiser becomes more consistent over the budget period and, in turn, increases the precision with which an advertiser's budget can be met. The variation of an advertiser's effective bid due to bid derating can be regulated, for example, by adjusting the softened demand curve of the advertiser.

In some implementations, the allocation subsystem 130 can implement a control loop that adjusts the softened demand curve in response to a determination that the variation of the effective bid exceeds a variation threshold. For example, the control loop can compare the variation of the advertiser's effective bid is lower than the variation threshold, the slope of the demand curve can be decreased and if the effective bid variation is higher than the variation threshold, the slope of the demand curve can be increased. Regulating effective bid variation is described in more detail with reference to FIG. 4C.

The actual supply that is provided by a web page is dependent on the number of advertisement slots that are presented with the web page. As described above, each additional advertisement slot that is presented with the web page will provide additional supply. However, as the number of advertisement slots and cumulative supply is increased, the prices paid by advertisers for the cumulative supply decreases to a common price at which the cumulative demand satisfies the cumulative price. Thus, additional advertisement slots can provide additional revenue until the common price at which the supply provided by the advertisement slots is reduced to a price where revenue begins to decrease.

In some implementations, the allocation subsystem 130 can manage the number of advertisement slots that are presented with a page by identifying a target price at which page revenue is optimized. Page revenue is the total revenue provided by allocation of advertisements slots on the page. The term optimized is used herein to indicate an increased performance in an attempt to provide optimal performance. Thus, the optimized or optimal page revenue discussed below reflects an increased page revenue relative to the page revenue provided by other advertisement slot configurations and not necessarily a highest achievable page revenue.

Figure 3E:
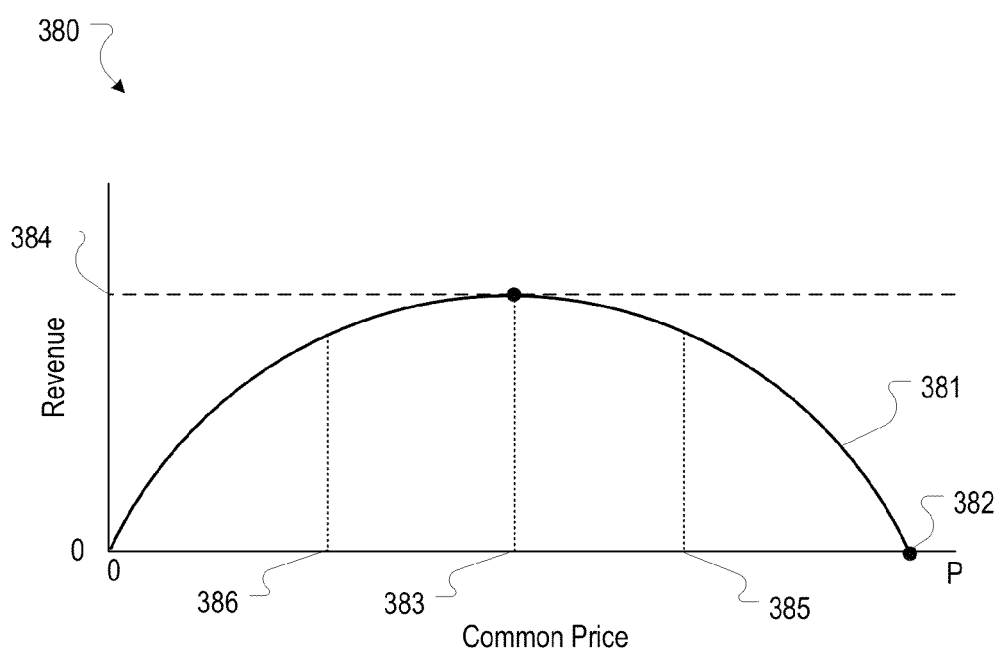
FIG. 3E is a graph illustrating page revenue over a range of prices.

FIG. 3E is a graph 380 illustrating an example page revenue over a range of prices. As illustrated by the curve 381, page revenue increases as the common price is lowered from a first price 382 until the price reaches the target price 383. As the common price is lowered from the target price 383, the page revenue falls until the revenue is zero at a common price of zero. This example curve 381 is presented as a symmetric curve relative to the target price 383, but the curve 381 does not have to be symmetric relative to the target price.

The rise and fall of page revenue across the price range corresponds to the demand and revenue/unit of supply that is provided across the price range. When the price of a slot is higher than the first price 382, demand is zero, and therefore, the page revenue provided each any slot presented with a page is also zero. Similarly, when the price is zero, the revenue generated by each slot presented with the page is zero, such that the page revenue is also zero.

As the allocation subsystem 130 initially lowers the common price from the first price 382 the demand increases, thereby increasing the revenue generated by a page because the increase in demand offsets the reduction in total revenue generated by the supply. However, when the increase in demand does not offset the reduced revenue being generated by the cumulative supply at the lower prices, the page revenue falls. The maximum revenue 384 is achieved at the target price 383. Therefore, when supply is provided to satisfy demand at the target price 383, page revenue is optimized.

In some implementations, the allocation subsystem 130 can identify the optimal price based on a golden ratio search. The golden ratio search is a technique for identifying a maximum or minimum value by iteratively identifying smaller and smaller ranges in which the maximum or minimum value exists. For example, the revenue per page can be generated for two prices 385 and 386 between zero and the first price 382. Based on the revenue per page for each of the prices, the price range in which the target price 383 is located can be redefined, for example, as the portion of the curve 381 between the two prices. The analysis can iteratively continue until the price range identified to contain the target price 383 that maximizes page revenue is less than a range threshold. For example, if the range threshold is $0.20, then the analysis can end when the target price is known to be within a $0.20 price range (e.g., $2.50-$2.70).

Once the target price 383 has been identified, the allocation subsystem 130 can determine a target number of advertisement slots that can provide the supply that is demanded at the target price 383. In some situations, the demand at the target price 383 can equal the cumulative supply that is provided by an integer number of advertisement slots. In these situations, the target number of advertisement slots will be the integer number of advertisement slots. Therefore, the allocation subsystem 130 can specify that the integer number of advertisement slots be presented with each presentation of the web page. For example, if the target price 383 corresponds to a total demand of 180% and two advertisement slots can provide a cumulative supply of 180%, then the two advertisement slots can be presented with each presentation of the web page.

In some situations, the demand may not equal the cumulative supply that is provided by an integer number of advertisement slots. For example, if the demand at the target price 383 is 160% and two advertisement slots provide a cumulative supply of 180%, then the cumulative supply will be greater than demand, and, in turn, lower the common price of the supply. In these situations, the target number of advertisement slots is between two integer numbers. For example, the allocation subsystem 130 can specify a first integer number of advertisement slots for presentation with a first portion of the web page presentations and a second integer number of advertisement slots for presentation with a second portion of the web page presentations. Thus, the allocation subsystem 130 can selectively provide advertisement slots to satisfy the demand at the target price 383 without providing excess supply.

The portion of web page presentations with which the second advertisement slot is presented can be based on a ratio of the supply that is required in excess of that provided by the first slot and the additional cumulative supply provided by two slots that is in excess of the supply provided by the first slot. For example, the supply in excess of that provided by the first slot required to satisfy demand at the target price above is 60% (i.e., 160%-100%). The cumulative supply provided by two slots that is in excess of the supply provided by the first slot is 80% (i.e., 180%-100%). Therefore, the portion of time that two slots are presented with the web page is 75% (i.e., 60%/80%). Accordingly, the allocation subsystem 130 can specify that two advertisement slots are presented for 75% of the web page presentations, while only one advertisement slot is presented in the other 25% of web page presentations.

In some implementations, the allocation subsystem 130 can provide slot data for a publisher that specifies a portion of page presentations with which each of the advertisement slots are to be presented. The slot data can be provided to the publisher, or with advertisements that are provided for the publisher. Alternatively, the page can be implemented to detect a number of advertisements presented in response to an advertisement request so that the slot data specifying which advertisement slots are to be presented is based on a number of advertisements provided in response to each page request.

Figure 4A:
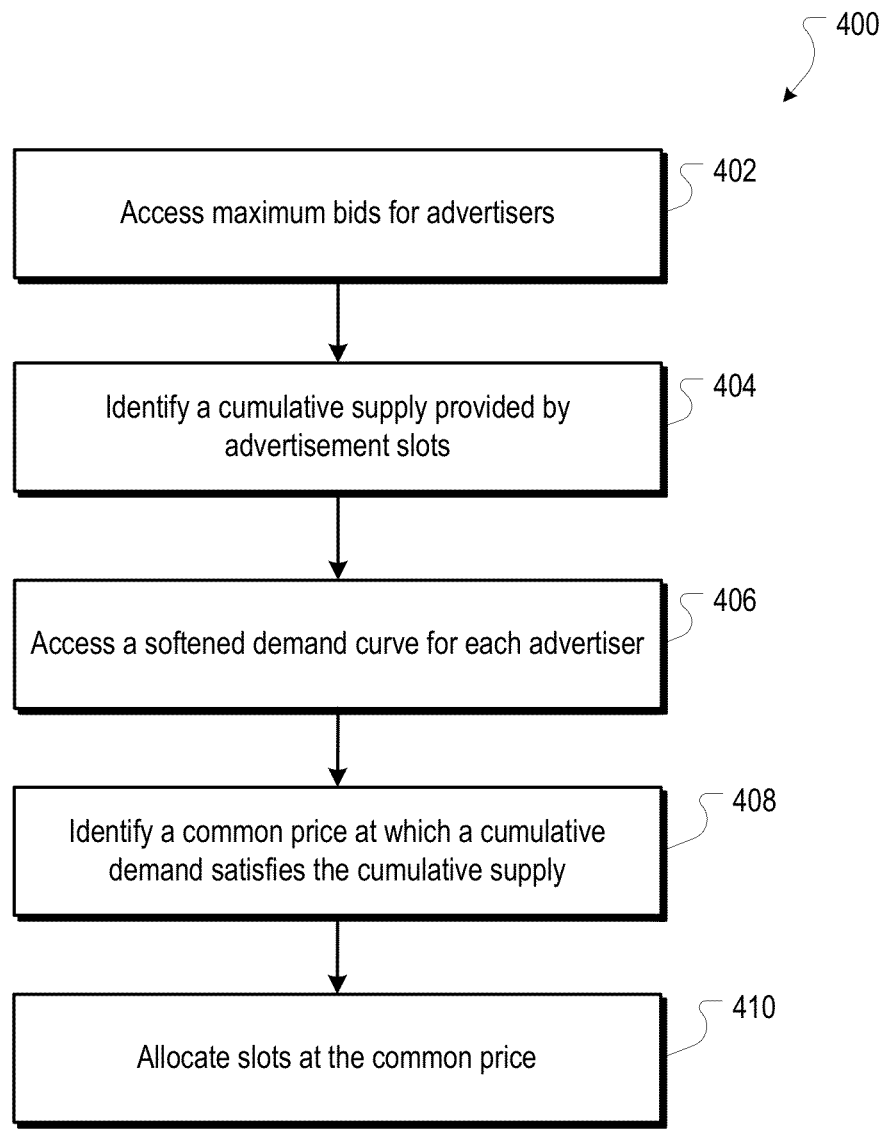
FIG. 4A is a flow chart of an example process for allocating supply.

FIG. 4 is a flow chart of an example process 400 for allocating supply at a common price. The process 400 can be implemented, for example, in the advertisement management system 104 and/or the reservation subsystem 130 of FIG. 1.

Maximum bids for advertisers are accessed (402). The maximum bids are the maximum prices that the advertisers will pay for allocation of an advertisement slot. In some implementations, advertiser budgets are also accessed for the advertisers that also specify a budget for a budget period. The budgets are maximum amounts that the advertisers will pay for allocation of advertisement slots over a specified budget period. The specified budget period is a period of time over which the advertiser's budget is measured. For example, an advertiser can specify a daily, weekly or monthly budget and the budget period will respectively correspond to a period of a day, week or month. The maximum bids and budgets can be accessed, for example, from the advertiser data store 114 of FIG. 1.

A cumulative supply provided by the advertisement slots over a specified period is identified (404). In some implementations, the cumulative supply is a sum of the slot performance provided by each advertisement slot presented with a page over the specified period. For example, if two advertisement slots are presented with a page, the cumulative supply can be measured as a sum of the advertisement slot performance (e.g., impressions) provided by each of the two advertisement slots over the period. The cumulative supply can be represented by a cumulative percentage of slot performance that is provided by the advertisement slots relative (i.e., normalized) to the slot performance provided by a single advertisement slot, as described above. The cumulative supply can be accessed, identified or otherwise received, for example, from the publisher data store 116.

A softened demand curve is accessed for each advertiser (406). In some implementations, the softened demand curve for each advertiser is defined by endpoints having price values that respectively correspond to the maximum bid for the advertiser and a specified percentage of the maximum bid (e.g., 90% of the advertisers bid). In these implementations, the softened demand curve for each advertiser is defined independent of whether the advertiser has specified a budget. For example, the demand curve for an advertiser having a maximum bid of $5.00 can have a demand curve with endpoints at $5.00 and $4.50, when the second end point is defined at a price value that is 90% of the maximum bid.

In other implementations, softened demand curves for advertisers that have specified a budget can each be based on the maximum bid and budget corresponding to the advertiser. In these implementations, the softened demand curve can specify a plurality of pairs of price (e.g., eCPM) and demand that will exhaust the budget corresponding to the advertiser at substantially the end of the budget period. For example, an advertiser can have a demand curve that is a straight line defined by data specifying a price of $5.00 at a demand of 0% of the cumulative supply and for the advertiser and $0.20 at a demand of 100% of the cumulative supply. The softened demand curve can be generated, for example, by the allocation subsystem 130. The softened demand curves can be accessed, for example, from the publisher datastore 116 of FIG. 1.

A common price at which a cumulative demand for slot performance satisfies the cumulative supply of slot performance is determined (408). The common price is a price at which a page revenue satisfies a page revenue threshold. The page revenue is a cumulative revenue of advertisement slots presented with the page. In some implementations, the common price is determined by iteratively lowering a price for the cumulative supply from a first price until cumulative demand satisfies the cumulative supply, as described above. The common price can be determined, for example, by the allocation subsystem 130.

The slots are allocated at the common price (410). In some implementations, the slots are allocated at the common price to advertisers according to portions of cumulative supply that the advertisers demand at the common price. When only one advertisement slot is being allocated for a page, the advertisement slot can be allocated to an advertiser based on the portion of slot performance that is demanded by the advertiser at the common price. For example, assuming that two advertisers each respectively demand 80% and 20% of the slot performance based on their demand curves, the advertisement slot can be allocated based on an output of a semi-random number generator such that the slot is allocated to the advertisers with 0.80 and 0.20 probability, respectively.

When more than one advertisement slot is being allocated on a page, both slots can be allocated to the advertisers at the common price. The advertiser that is allocated a more preferred slot (e.g., a slot having higher on the page or a higher normalized click through rate) can be determined based on the portion of slot performance that is demanded by each of the advertisers at the common price relative to the supply of slot performance provided by the more preferred slot. Continuing with the example above, the more preferred slot can be allocated to the advertiser that demands 80% of the cumulative slot performance with a probability of 0.80/0.95 when the more preferred slot provides 95% of normalized slot performance, as described above.

While the common price can be computed for each allocation of advertisement slots, the slots can also be allocated at the common price until the occurrence of a specified condition. The specified condition can be, for example, a threshold number of allocations at the common price, or based on the occurrence of another event. Example events that can define the specified condition can include a change in the bids that are used to compute the common price. A change in bids can be based on a new bid being provided by a new bidder, a change to the maximum bids of advertisers or other events that may change the price at which the cumulative supply is demanded, as described below.

In some implementations, a change to an advertisers bid can be the result of bid derating that computes an effective bid for the advertiser that is lower than the maximum bid for an advertiser. The effective bid, rather than the maximum bid, is then used for computing the common price. The effective bid is computed, for example, based on actual and target spend rates for the advertiser. As described above, when an advertiser's actual spend rate for a budget period is higher than the target spend rate for the budget period, the advertisers effective bid can be computed as a fraction of the advertiser's maximum bid that will result in the advertiser's target spend rate being closer to the target spend rate.

Figure 4B:
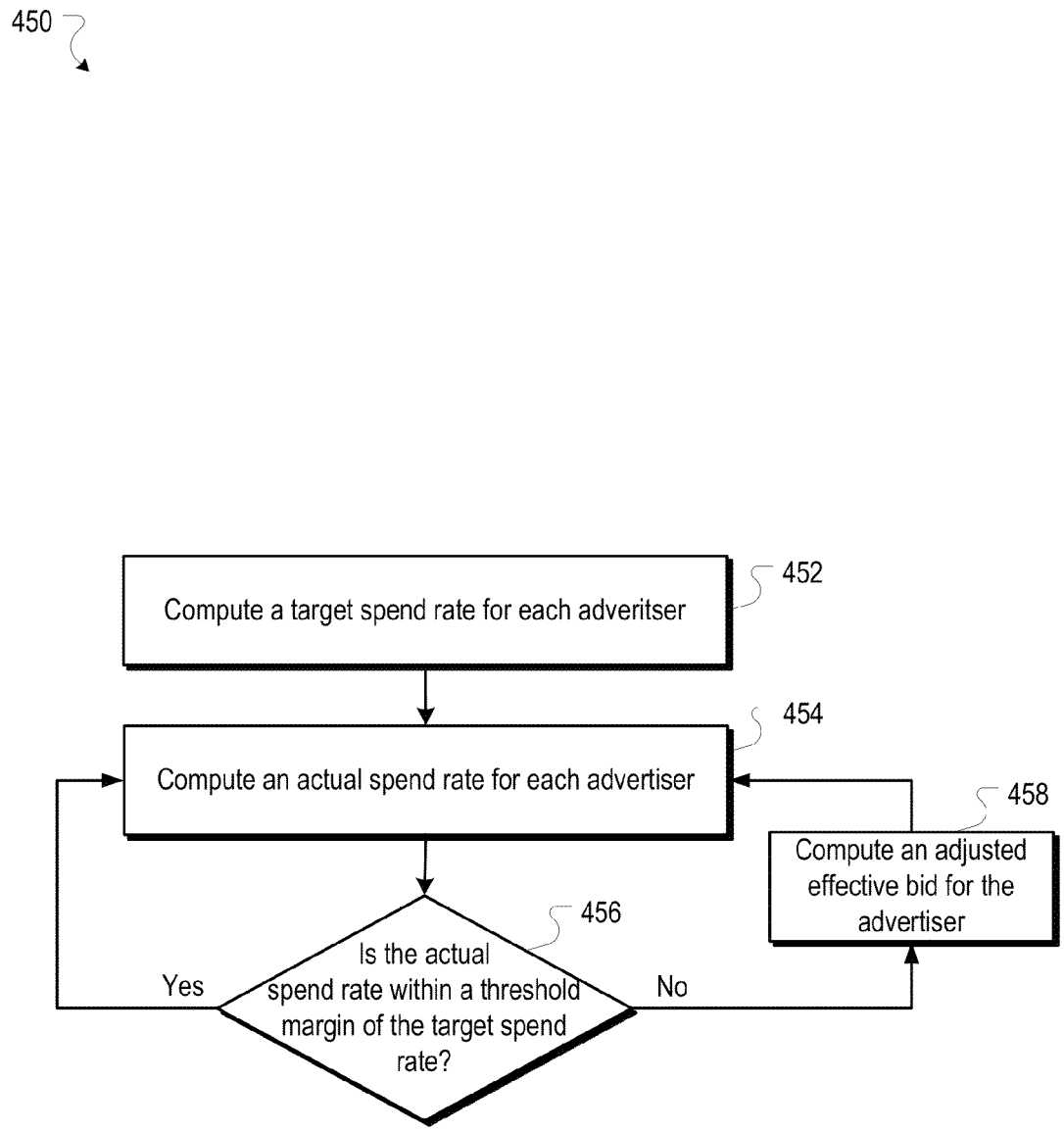

FIG. 4B is an example process 450 for adjusting an advertiser's effective bid based on spend rates during a budget period. The process 450 is a process by which target spend rates and actual spend rates are computed for an advertiser that has specified a budget for its advertisements and the effective bid for an advertiser is adjusted based on a comparison of the actual spend rate to the target spend rate. The process 450 can be implemented, for example, by the allocation subsystem 130 of FIG. 1.

A target spend rate is computed for each advertiser (452). The target spend rate is a spend rate at which the advertiser's budget will be exhausted at substantially the end of the budget period. In some implementations, the target spend rate can be generated based on the maximum bid, the budget, and a length of the budget period. Continuing with the example above, an advertiser that specifies a budget of $100 and has a price/demand pair of $5.00 eCPM for each of 20 units of supply that are available over the budget period will have a target spend rate of $4.17 per hour, or 1 unit of supply (e.g., impression) every 1.2 hours. The target spend rate can be generated, for example, by the allocation subsystem 130.

An actual spend rate is computed for each advertiser (454). In some implementations, the actual spend rate is generated based on an amount paid for advertisement slots though a portion of the budget period. For example, the actual spend rate for an advertiser that has spent $24 in a day is $24/day or $1/hour. The actual spend rate can be generated, for example, by the allocation subsystem 130.

A determination is made whether the actual spend rate is within a threshold margin of the target spend rate (456). The determination is made for each advertiser based on the advertiser's actual spend rate relative to the advertiser's target spend rate. If the actual spend rate is within the threshold margin, the advertisement slots continue to be allocated and after a threshold time the actual spend rate for the advertiser is again computed (454).

If the actual spend rate for an advertiser is outside of the threshold margin, an adjusted effective bid is computed for the advertiser (458). The adjusted effective bid is a maximum price that the advertiser will pay for allocation of an advertisement slot based on the maximum bid, budget and actual spend rate. The adjusted effective bid can be a fraction (i.e., a ratio less than one) of the maximum bid for the advertiser that will cause the advertiser's actual spend rate to be reduced.

The fraction can be computed, for example, based on a derating factor. The derating factor can be computed, for example, based on a function of a current derating factor for the advertiser, the amount of time remaining in the budget period and a mathematical difference between the actual spend rate and target spend rate ("spend rate error") for the advertiser. For example, the derating factor can be a result of a sum of the current derating factor and a product of the spend rate error and a portion of the budget period remaining (i.e., derating factor=(current derating factor)+(spend rate error*budget period remaining)).

Once the derating factor is computed, it can be used to compute the adjusted effective bid for the advertiser, for example, based on a product of the derating factor and the maximum bid for the advertiser. The adjusted effective bid can be generated, for example, by the allocation subsystem 130. The process 450 can repeat periodically (e.g., every hour) to adjust the advertisers effective bid, and in turn, regulate the advertiser's spend rate.

As described above, bid derating can result in a large variations of the advertiser's effective bid, thereby creating large changes in the number of impressions that an advertiser receives and, in turn, the spend rate of the advertiser. In some implementations, the variation of an advertiser's effective bid due to bid derating can be regulated by adjusting the softened demand curve of the advertiser.

Figure 4C:
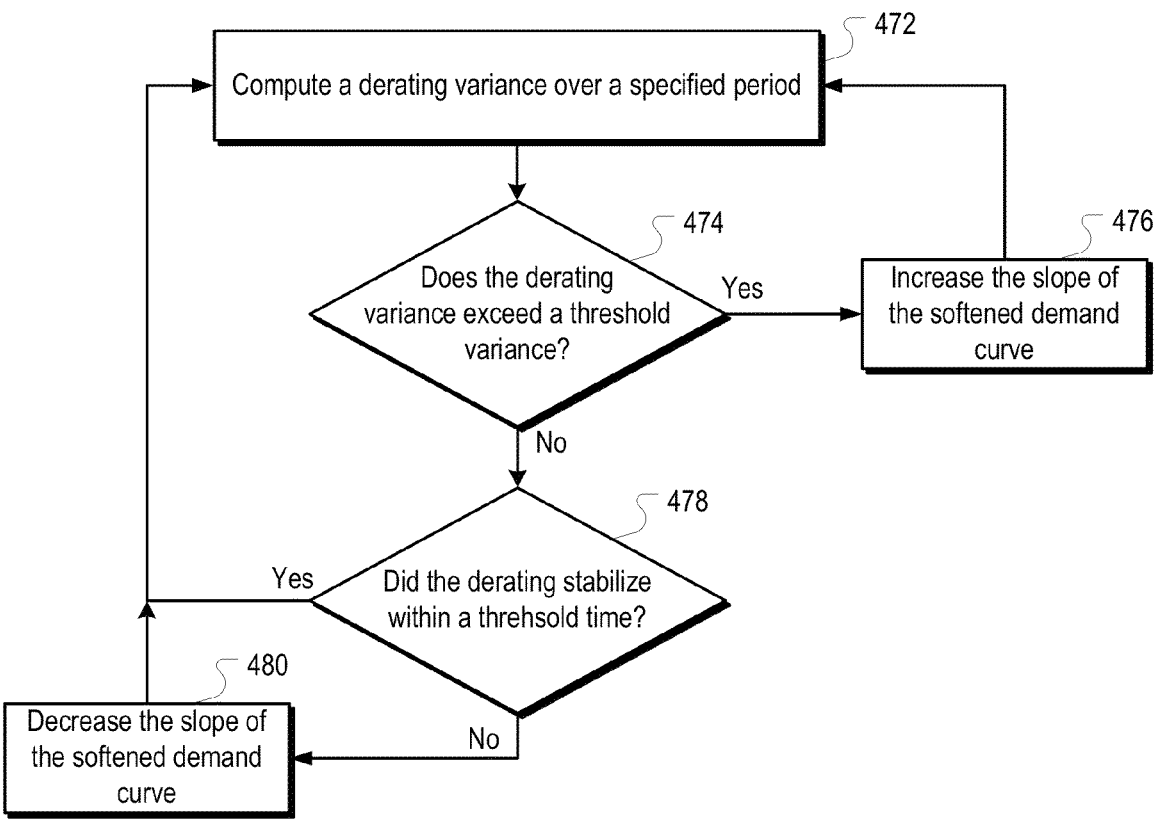

FIG. 4C is an example process 470 for regulating the variation of an advertisers effective bid. The process 470 is a process by which the slope of an advertiser's softened demand curve is adjusted based on a derating variance that is computed for the advertiser over a specified time. When the derating variance is greater than a threshold variance, the slope of the advertisers softened demand curve is increased. When the derating variance for the advertiser is less than the threshold variance, but takes longer than a threshold time to stabilize, the slope of the advertiser's softened demand curve is decreased. The process 470 can be implemented, for example, by the allocation subsystem 130 of FIG. 1.

A derating variance over a specified period is computed (472). In some implementations, an advertiser's derating variance can be computed based on a percentage change in the derating factor (or effective bid) for the advertiser over the specified period or over successive changes to the derating factor. The specified period can be, for example, an amount of time, a number of allocations, or any other delineation of time or events over which the variation of the derating factor can be computed. In some implementations, the variance of the derating factor is based on an average change in sequential values for the derating factor.

A determination is made whether the derating variance exceeds a threshold variance (474). The threshold variance can be specified, for example, based on the precision with which the advertisers effective bid is to be controlled. For example, when more precise control of the advertiser's effective bid and, in turn, actual spend rate is desired, a lower threshold variance can be specified than when less precise control of the advertiser's effective bid is desired. The determination can be made, for example, by comparing the value of the derating variance to the threshold variance.

When the derating variance exceeds the threshold variance, the slope of the softened demand curve is increased (476). In some implementations, the softened demand curve is increased by a constant value (e.g., 0.1). In other implementations, the advertiser's softened demand curve can be adjusted based on a function of the magnitude with which the derating variance exceeds the threshold variance. For example, when the derating variance exceeds the threshold variance by 10 percent, the softened demand curve can be increased by 5 percent (i.e., 0.5*10%). Other functions (i.e., logs or exponentials) of the magnitude can also be used. Following the increase in the slope of the softened demand curve, the derating variance can again be computed over a specified period (472).

When the derating variance does not exceed the threshold variance, a determination is made whether the derating factor stabilized within a threshold time (478). In some implementations, the threshold time can be specified based on the period over which the derating factor is computed. For example, the threshold time can be set to a time that represents 40 percent of the period over which the derating factor is computed. Other threshold times can be selected. The derating factor can be defined as stabilized when the derating factor varies less than a stabilization threshold that defines maximum variance for a stabilized derating factor.

When the derating factor stabilizes within the threshold time, another derating variance can be computed over a specified period (472). When the derating factor does not stabilize within the threshold time, the slope of the softened demand curve is decreased (480). In some implementations, the softened demand curve is decreased by a constant value (e.g., 0.1). In other implementations, the advertiser's softened demand curve can be adjusted based on a function of the magnitude with which a stabilization time for the derating factor exceeds the threshold time. Following the decrease in the slope of the softened demand curve, the derating variance can again be computed over a specified period (472).

In addition to allocating advertisement slots to advertisers at a common price and regulating the spend rate of advertisers that have specified a budget, revenue generated by publisher's properties can be optimized (i.e., increased relative to a baseline performance or to approach a calculated maximum revenue) while still providing increased value to the advertisers.

For example, the total revenue that a web page will generate when presenting one, two, three, or any other number of advertisements can be computed based on the softened demand curves of the advertisers. In turn, a number of advertisement slots (i.e., cumulative supply) that will provide maximum revenue can be computed, and the web page can provided for presentation with that number of advertisement slots. Providing the web page with the number of advertisement slots that are computed to maximize review optimizes page revenue for the publisher.

Figure 5:
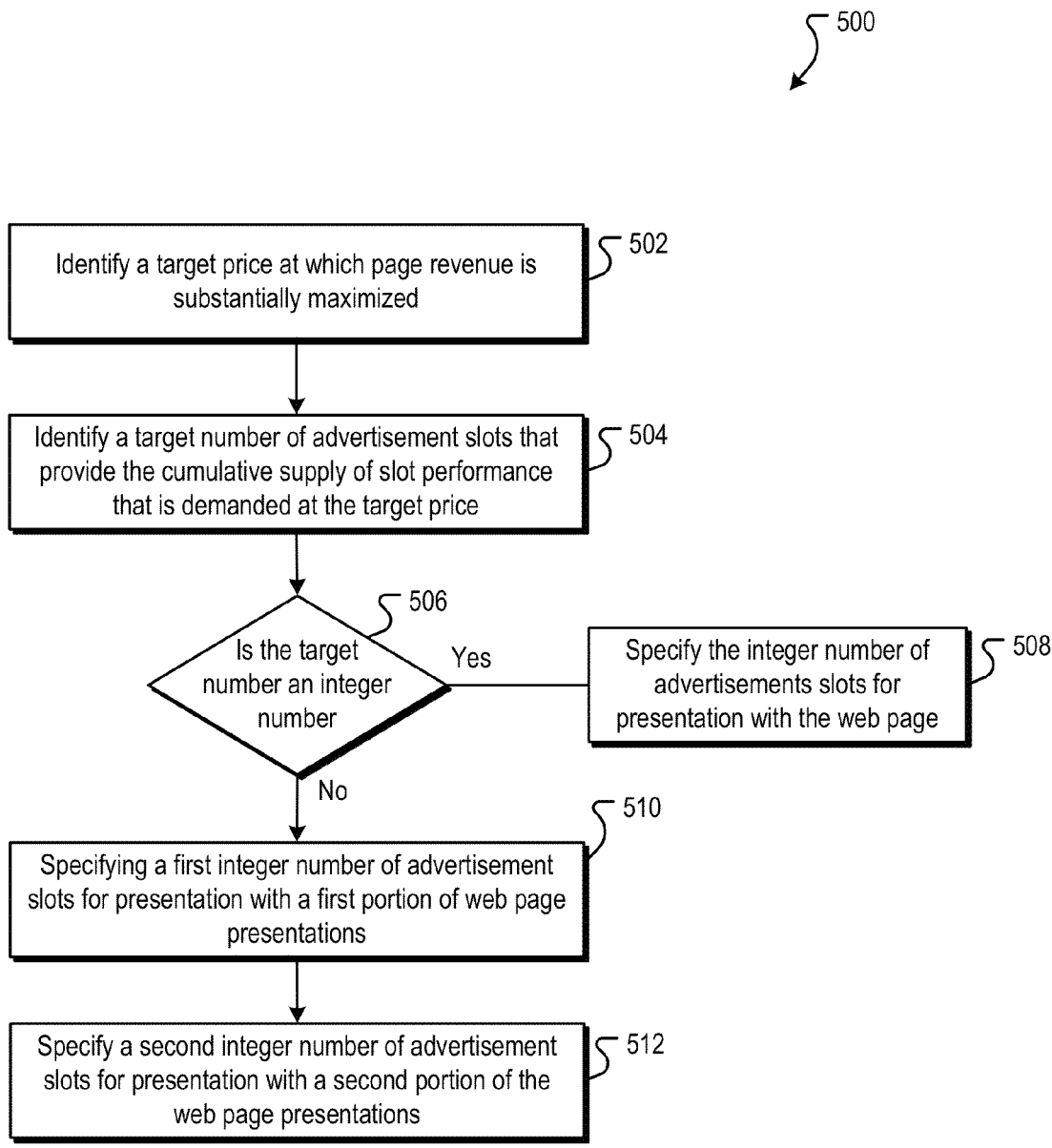
FIG. 5 is a flow chart of an example process for optimizing page revenue.

FIG. 5 is a flow chart of an example process 500 for optimizing page revenue. The process 500 can be implemented, for example, in the allocation subsystem 130.

A target price at which page revenue is substantially maximized is identified (502). In some implementations, the target price is identified by iteratively calculating a total revenue generated based on the cumulative supply and cumulative demand at each common price. The iterative calculation of total revenue can be generated, for example, based on a linear scan, golden ratio or hill-climbing algorithm. The target price can be identified, for example, by the allocation subsystem 130.

A target number of advertisement slots that provide a cumulative supply that is demanded at the target price is identified (504). In some implementations, the cumulative supply is measured as a sum of the slot performance provided by each advertisement slot that is presented with a web page. The cumulative supply can be represented, for example, as a sum of the percentages of slot performance provided by each advertisement slot relative to the slot performance available when a single advertisement slot is presented with the web page. The target number of advertisement slots can be identified, for example, by the allocation subsystem 130.

A determination is made whether the target number of advertisement slots is an integer number of advertisement slots (506). In some situations, the cumulative supply demanded at the target price can be supplied by an integer number of advertisement slots that are presented for each presentation of the web page. In these situations, the target number of advertisement slots is an integer number of advertisements and the integer number of advertisement slots can be specified for presentation with the web page for each presentation of the web page (508).

In some situations, the cumulative supply demanded at the target price can be supplied by a non-integer number of advertisement slots, as described above. In these situations, a first integer number of advertisement slots are specified for presentation with a first portion of web page presentations (510) and a second integer number of advertisement slots are specified for presentation with a second portion of the web page presentations (512). For example, as described above, if two advertisement slots can be provide 180% supply, but the cumulative demand at the target price is 160% supply, then two advertisement slots will be presented with 75% of the web page presentations, while only one advertisement slot will be presented with 25% of the web page presentations.

Figure 6:
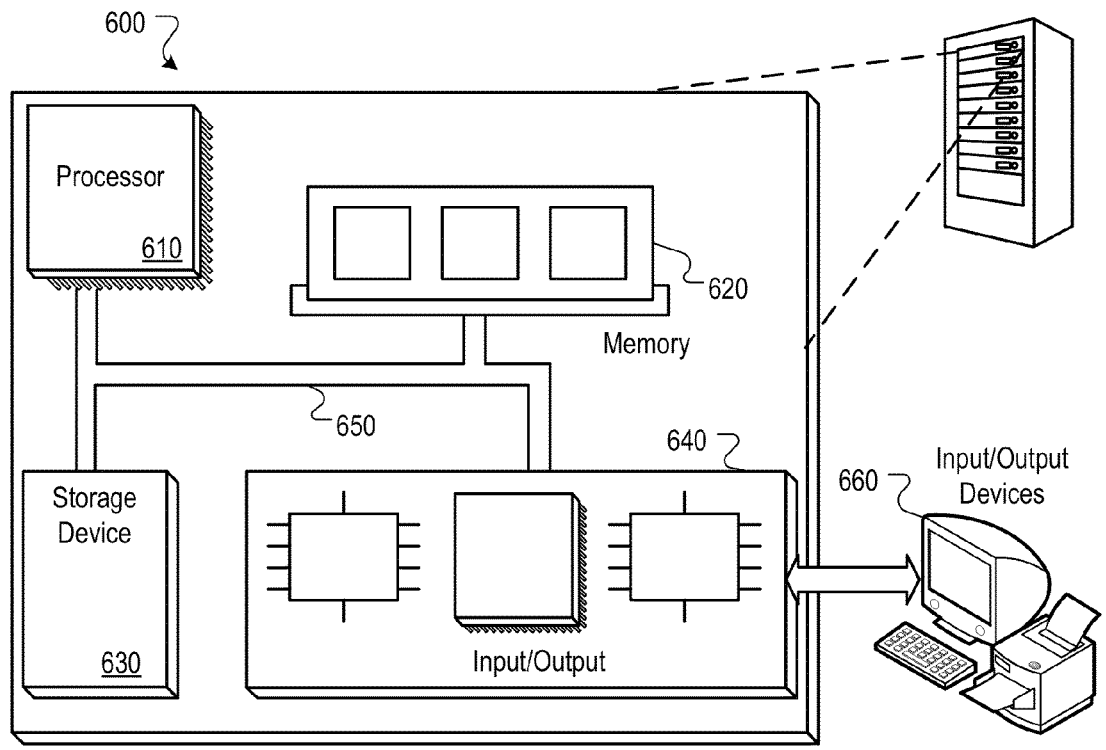
FIG. 6 is block diagram of an example computer system that can be used to facilitate allocation of advertisement slots.

FIG. 6 is block diagram of an example computer system 600 that can be used to facilitate allocation of advertisement slots. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The allocation subsystem 130 and/or advertisement management system 104 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The auction subsystem 116 and/or advertisement management system 104 can be distributively implemented over a network, such as a server farm, or can be implemented in a single computer device.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system," "processing devices" and "subsystem" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. While reference is made to delivering advertisements, other forms of content including other forms of sponsored content can be delivered.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   identifying, by a processing device, a derating variance over a specified period, the derating variance being a measure of variance for an effective bid over the specified period;
   determining, by a processing device, whether the derating variance exceeds a threshold variance;
   increasing, by a processing device, a slope of a demand curve to generate an adjusted demand curve, in response to the derating variance exceeding the threshold variance;
   decreasing, by a processing device, the slope of the demand curve to generate an adjusted demand curve, in response to the derating variance not exceeding the threshold variance;
   and
   allocating, by a processing device, advertisement slots based on the adjusted demand curve.

2. The method of claim 1, further comprising:
   determining, by a processing device, that the derating did not stabilize within a threshold time; and decreasing, by a processing device, the slope of the demand curve in response to the determination that the derating did not stabilize within the threshold time to generate the adjusted demand curve.

3. The method of claim 1, further comprising computing the demand curve as a softened demand curve.

4. The method of claim 3, wherein computing the demand curve comprises:
accessing a maximum bid for the advertiser, the maximum bid being a maximum price that the advertiser agrees to pay for allocation of advertisement slots;
identifying a cumulative supply of advertisement slots; and
generating the softened demand curve based on the maximum bid, the softened demand curve specifying a plurality of pairs of price and demand for the advertiser.

5. The method of claim 4, wherein allocating advertisement slots comprises:
identifying a common price at which the cumulative supply satisfies cumulative demand for advertisement slots, the common price being a price at which a page revenue satisfies a page revenue threshold; and
allocating the advertisement slot to the advertiser based on a portion of the cumulative supply demanded by the advertiser at the common price.

6. The method of claim 4, further comprising:
accessing a budget for the advertiser and a budget period;
computing a target spend rate based on the budget and the budget period, the target spend rate being a spend rate at which the budget will be exhausted at substantially the end of the budget period;
computing an actual spend rate based on an expense amount incurred for advertisement slots though a portion of the budget period;
determining that the actual spend rate is not within a threshold margin of the target spend rate; and
in response to the determination that the actual spend rate is not within the threshold margin of the target spend rate, computing an effective bid based on a derating factor.

7. The method of claim 6, further comprising computing the derating factor based on a difference between the actual spend rate and the actual spend rate.

8. The method of claim 6, wherein the effective bid is increased in response to an actual spend rate that is less than the target spend rate.

9. The method of claim 6, wherein the effective bid is decreased in response to an actual spend rate that is greater than the target spend rate.

10. A system comprising:
a datastore storing bids for advertisers, the bids being maximum amounts that the advertisers agree to pay for an advertisement slot; and
an allocation subsystem coupled to the datastore, the allocation subsystem comprising at least one processor configured to regulate variance of an effective bid for an advertiser based on an adjusted demand curve for the advertiser, the adjusted demand curve having a slope that is adjusted in response to a derating variance measured over a specified period.

11. The system of claim 10, wherein the allocation subsystem is further configured to increase the slope of the demand curve in response to a determination that the derating variance exceeds a threshold variance.

12. The system of claim 11, wherein the allocation subsystem is further configured to decrease the slope of the demand curve in response to a determination that the derating variance is less than the threshold variance and did not stabilize within a threshold time.

13. The system of claim 10, wherein the allocation subsystem is further configured to allocate advertisement slots based on the adjusted demand curve.

14. The system of claim 10, wherein the allocation subsystem is further configured to compute the demand curve based on a maximum bid specified for the advertiser and a cumulative supply of advertisement slots.

15. The system of claim 14, wherein the allocation subsystem is further configured to identify a common price at which the cumulative supply satisfies a cumulative demand for advertisement slots and allocate advertisement slots at the common price.

16. The system of claim 14, wherein the datastore further stores budgets for advertisers over a budget period and the allocation subsystem is further configured to compute an effective bid for an advertiser based on a difference between an actual spend rate and a target spend rate, the target spend rate being a spend rate at which the budget will be exhausted at substantially the end of the budget period.

17. A computer-readable medium encoded with a computer program comprising instructions that when executed operate to cause a computer to perform operations including:
identifying a derating variance over a specified period, the derating variance being a measure of variance for an effective bid over the specified period;
determining whether the derating variance exceeds a threshold variance;
increasing a slope of a demand curve to generate an adjusted demand curve, in response to the derating variance exceeding the threshold variance;
decreasing the slope of the demand curve to generate an adjusted demand curve, in response to the derating variance not exceeding the threshold variance; and
allocating advertisement slots based on the adjusted demand curve.

18. The computer-readable medium of claim 17, further comprising instructions that cause a computer to perform operations including:
determining that the derating did not stabilize within a threshold time; and
decreasing the slope of the demand curve in response to the determination that the derating did not stabilize within the threshold time to generate the adjusted demand curve.

19. The computer-readable medium of claim 17, further comprising instructions that cause a computer to perform operations including:
accessing a maximum bid for the advertiser, the maximum bid being a maximum price that the advertiser agrees to pay for allocation of advertisement slots;
identifying a cumulative supply of advertisement slots; and
generating the softened demand curve based on the maximum bid, the softened demand curve specifying a plurality of pairs of price and demand for the advertiser.

20. The computer-readable medium of claim 17, further comprising instructions that cause a computer to perform operations including:
accessing a budget for the advertiser and a budget period;
computing a target spend rate based on the budget and the budget period, the target spend rate being a spend rate at which the budget will be exhausted at substantially the end of the budget period;

computing an actual spend rate based on an expense amount incurred for advertisement slots though a portion of the budget period;

determining that the actual spend rate is not within a threshold margin of the target spend rate; and in response to the determination that the actual spend rate is not within the threshold margin of the target spend rate, computing an effective bid based on a derating factor.

* * * * *